United States Patent [19]

Carlson et al.

[11] 4,029,965

[45] June 14, 1977

[54] VARIABLE GAIN X-RAY IMAGE INTENSIFIER TUBE

[75] Inventors: Allan Ivan Carlson, Ossining; Barry M. Singer, New York, both of N.Y.

[73] Assignee: North American Philips Corporation, New York, N.Y.

[22] Filed: Feb. 23, 1976

[21] Appl. No.: 660,728

Related U.S. Application Data

[63] Continuation-in-part of Ser. No. 550,362, Feb. 18, 1975, abandoned.

[52] U.S. Cl. .................................. 250/370; 357/31

[51] Int. Cl.² .......................................... G01T 1/22

[58] Field of Search ...................... 250/370; 357/31

[56] References Cited

UNITED STATES PATENTS

| | | | |
|---|---|---|---|
| 3,458,782 | 7/1969 | Buck et al. | 357/31 |
| 3,607,466 | 9/1971 | Miyazaka | 148/175 |
| 3,687,745 | 8/1972 | Chang et al. | 357/31 |
| 3,786,294 | 1/1974 | Wilson et al. | 357/31 |

FOREIGN PATENTS OR APPLICATIONS

| | | | |
|---|---|---|---|
| 1,273,464 | 5/1972 | United Kingdom | 357/31 |

*Primary Examiner*—Harold A. Dixon
*Attorney, Agent, or Firm*—Frank R. Trifari

[57] ABSTRACT

X-ray image intensifier tube comprises a silicon diode array imaging target which, on the electron bombarded side, is provided with a deeply diffused phosphorus $n^+$ layer covered with a metallic buffer layer.

7 Claims, 3 Drawing Figures

VARIABLE GAIN X-RAY IMAGE INTENSIFIER TUBE

This is a continuation-in-part of application Ser. No. 550,362, filed Feb. 18, 1975, now abandoned.

This invention relates generally to X-ray image intensifier tube and more specifically to a silicon diode array imaging target for such X-ray intensifier.

Conventional silicon intensified target (SIT) operates with incident electrons accelerated to energies from 2.5 to 10 keV, corresponding to target gains of approximately 1 to 2000, respectively. In practice, the photocathode of the X-ray image intensifier tube is held at a negative potential and the photo electrons strike the target which is near ground potential. The disadvantage of the standard silicon intensified target is in the fact that in the range required for an X-ray image intensifier tube having photocathode voltages of minus 19 kilovolts to minus 25 kilovolts, the target gain is too high and the X-ray flux into the image intensifier must therefore be kept low to avoid saturating the output signal of the target. An X-ray image intensifier tube operated in this manner has a low signal to noise ratio.

The object of this invention is to remove this drawback and to provide a silicon intensified target which is suitable for use in connection with X-ray image intensifier tubes. More specifically, an object of this invention is to provide an X-ray image intensifier tube having a variable gain in the range of 3 to 300, for instance, while photocathode voltages varies from minus 19 kilovolts to minus 25 kilovolts, respectively.

According to this invention, the above objects are obtained by a deep phosphorus diffusion into the electron bombarded side of the target to produce a deep $n^+$ dead layer and covering the dead layer with a metallic buffer layer which is permeable to electrons. The thickness of the dead layer and of the buffer layer is selected so as to dissipate sufficient incident electron energy to shift the gain vs. photocathode voltage curves of a conventional silicon intensified target to the range required for an X-ray intensifier tube.

The invention will now be described in greater detail in the following description of a preferred embodiment, taken in conjunction with accompanying drawings in which.

Figure 1:
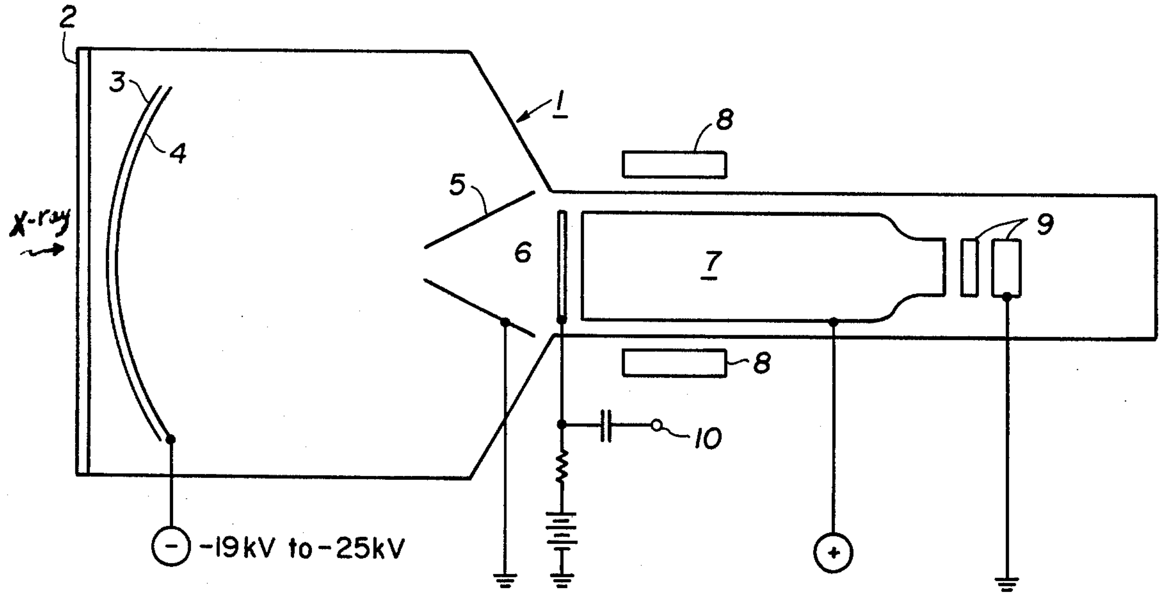
FIG. 1 is a schematic representation of an X-ray image intensifier tube.

Referring now to FIG. 1, an X-ray image passes through window 2 of an X-ray image intensifier tube 1 and excites a scintillation screen 3 which in turn illuminates photocathode 4 which is in close proximity to the scintillation screen. Electrons emitted by the photocathode are focused by a focusing cone 5 and projected onto one side of a silicon diode array imaging target 6 as it will be explained later with reference to FIG. 2. The opposite side of the target 6 is scanned by an electron beam from electron gun 7 which also includes a cathode and grid electrodes 9. The emitted scanning electron beam is deflected in conventional manner by deflection means 8.

Figure 2:
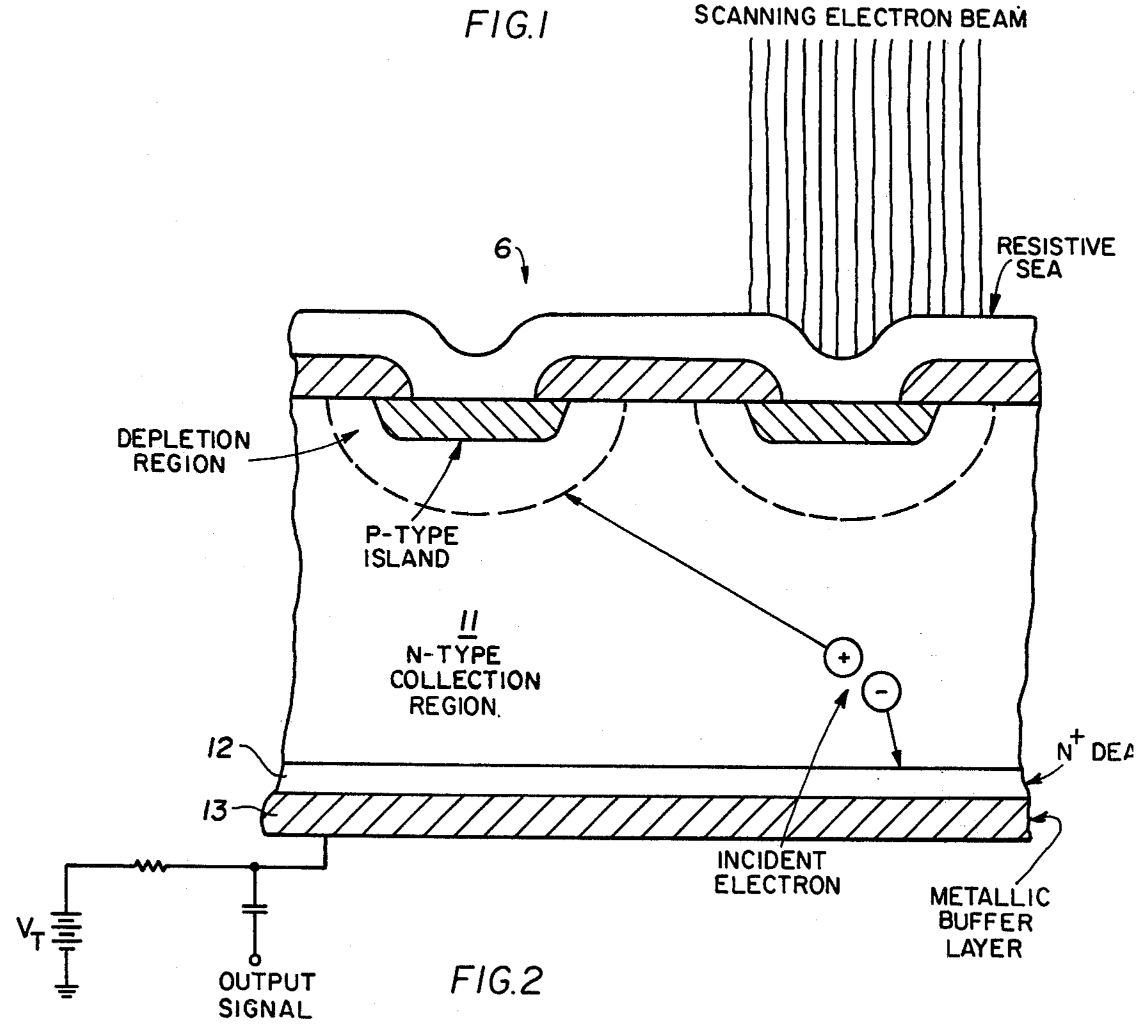
FIG. 2 is a cross-sectional enlarged view of a portion of the silicon diode array imaging target according to this invention.

In the X-ray image intensifier tube of this type, an increased negative voltage has to be applied to the photocathode in comparison to a SIT tube to obtain good resolution in the electron optics of the intensifier tube. In order to adapt the silicon diode array imaging target 6 to the above requirements of the X-ray image intensifier tube, it is essential that the gain of the target 6 be adjustable between approximately 3 and 300, while the photocathode voltage is varied between approximately minus 19 kilovolts and minus 25 kilovolts, depending upon the particular design of the electron optics of the intensifier section. As shown in FIG. 2, these high energy electrons incident upon the n-type silicon collection region 11 create a multiplicity of hole-electron pairs in region 11. The electron pairs diffuse to and discharge reverse biased p,n diodes on the opposite surface of the target. The resulting charge stored on these diodes produces a potential profile corresponding to the incident electron image. The potential profile is scanned and read-out by electron gun 7.

In order to adapt the silicon intensified target 6 to the aforementioned requirement of the X-ray image intensifier tube, where the photocathode voltage is varied between approximately minus 19 kilovolts and minus 25 kilovolts, and the target gain has to be adjustable between approximately 3 to 300, the n-type silicon collection region 11 on the side facing the incident electrons is modified by heavy diffusion of phosphorus to produce a deep $n^+$ dead layer 12 and by covering its surface with a metallic buffer layer 13. The thickness of the dead layer 12 is about 0.5 micron and thickness of the metallic layer is about 1 micron. The depth of the combination dead layer 12 can be adjusted to minimize defects and non-uniformities of target response caused by imperfections in the metallic buffer layer 13.

Figure 3:
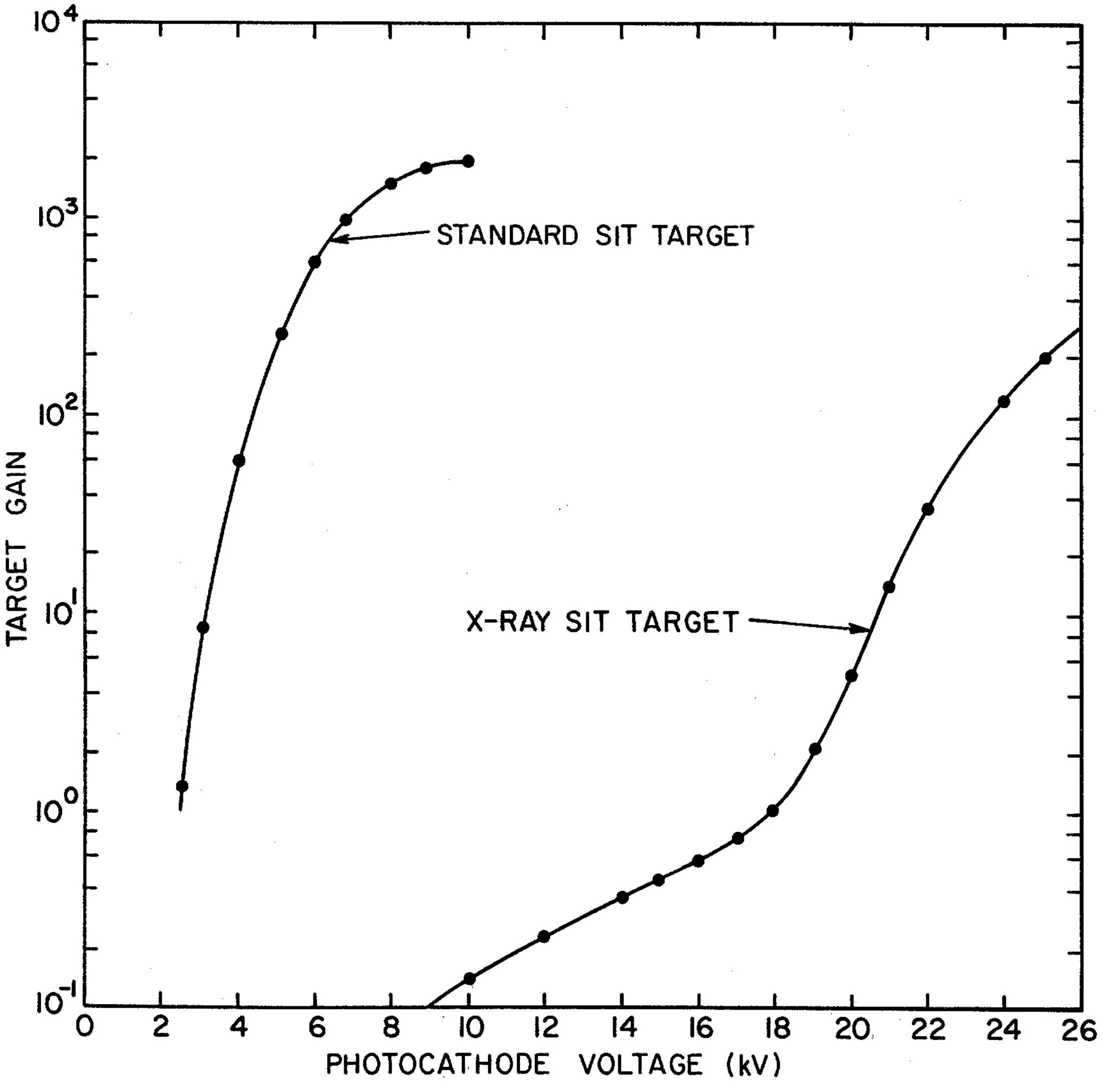
FIG. 3 shows the gain vs. photocathode voltage curves of a standard silicon intensified target in comparison with the target according to this invention.

Typical gain curves for a standard SIT target and an X-ray SIT target according to this invention are shown in FIG. 3. The plotted curves show that the incorporation of the target 6 according to this invention into an X-ray image intensifier tube will permit the operator to easily adjust the gain of the tube from 3 to 300 to give optimum signal-to-noise ratio for a specific diagnostic situation.

Referring again to FIG. 2, the collection region 11 is a single crystalline silicon substrate. The phosphorus diffusion which produces the $n^+$ dead layer 12 is adjusted to give a very slow rise in the collection efficiency vs. the depth into the target. At the 5% collection efficiency point the rise in collection efficiency vs. change in depth into the target should be less than about 50% per 0.1 um, with correspondingly low rate of rises at other points on the collection efficiency curve.

The very slow rise in collection efficiency vs. depth into the target produces two beneficial effects: 1) Non-uniformities in target response caused by non-uniformities in the metallic buffer layer are reduced. 2) Excess target noise caused by the absorption in the collection region of energetic X-ray quanta generated by photoelectrons incident on the metallic buffer layer is greatly reduced.

As it has been explained in the preceding description, the adjustment of the combined thickness of the $n^+$ dead layer and the metallic buffer layer makes it possible to modify the target gain for a given photocathode voltage range so as to fall within the gain range which is required for X-ray image intensifier tubes. For example, the combined thickness is adjusted so as to provide the target gain which ranges from unity to about 300 at photocathode voltages from approximately 19 kv to 26 kv (FIG. 3).

The buffer layer 13 is made either of a single material or of two superposed layers 13*a* and 13*b* of different materials. In the former case, the material such as beryllium has a low atomic number which produces a low level of X-rays due to the incident high energy electrons; in the latter case, the outside layer which receives the incident high energy electrons has a low atomic number as in the case of the single material buffer layer, whereas the inside layer is of a material which has a relatively high density, such as niobium for example, and which also has a weakly generated K X-ray line due to the high energy electrons that penetrate the outside layer, and an L line that is strongly absorbed by the $n^+$ dead layer. The thickness of the outside layer is adjusted to absorb about one half of the incident electron energy, and the density of the inside layer is high enough to limit the lateral diffusion of the high energy electrons that penetrate the outside layer to less than 1 micron to avoid degrading the resolution of the target.

Having thus described the invention, what we claim as new and desire to be secured by Letters Patent, is as follows:

1. A electron sensitive silicon diode array target for use in an X-ray image intensifier tube having an electron scanning beam read-out and a predetermined range of photocathode voltages, an n-type single crystalline silicon substrate with a plurality of p-type islands on the side of the substrate that is scanned with the electron read-out beam; a resistive film covering the plurality of p-type islands; a deep $n^+$ dead layer on the side of the substrate that receives the high energy incident electrons; a metallic buffer layer deposited on the $n^+$ dead layer, the combined thickness of said $n^+$ dead layer and said buffer layer being adjusted for providing target gain in said range of photocathode voltages, which is required for the X-ray image intensifier tube, and combined thickness of the $n^+$ dead layer and the metallic buffer layer being adjusted for providing a target gain which ranges from unity to about 300 at photocathode voltages from about −19 kv to −26 kv, respectively.

2. An electron sensitive silicon diode array target for use in an X-ray image intensifier tube having an electron scanning beam read-out and a predetermind range of photocathode voltages, an n-type single crystalline silicon substrate with a plurality of p-type islands on the side of the substrate that is scanned with the electron read-out beam; a resistive film covering the plurality of p-type islands; a deep $n^+$ dead layer on the side of the substrate that receives the high energy incident electrons; a metallic buffer layer deposited on the $n^+$ dead layer, the combined thickness of said $n^+$ dead layer and said buffer layer being adjusted for providing target gain in said range of photocathode voltages, which is required for the X-ray image intensifier tube, and the metallic buffer layer consisting of a single material having a low atomic number to produce low energy level of X-rays due to the incident high energy electrons.

3. A silicon diode array target as claimed in claim 2, wherein said single material is beryllium.

4. An electron sensitive silicon diode array target for use in an X-ray image intensifier tube having an electron scanning beam read-out and a predetermined range of photocathode voltages, an n-type single crystalline silicon substrate with a plurality of p-type islands on the side of the substrate that is scanned with the electron read-out beam; a resistive film covering the plurality of p-type islands; a deep $n^+$ dead layer on the side of the substrate that receives the high energy incident electrons; a metallic buffer layer deposited on the $n^+$ dead layer, the combined thickness of said $n^+$ dead layer and said buffer layer being adjusted for providing target gain in said range of photocathode voltages, which is required for the X-ray image intensifier tube, and the metallic buffer layer consisting of two superposed films of different materials, the outer film which receives the incident high energy electrons having low atomic number and the inner film having a relatively high density, a weakly generated $K_\alpha$ X-ray line due to the high energy electrons that penetrate the outside film, and an $L_\alpha$ line that is strongly absorbed by the $n^+$ dead layer.

5. A silicon diode array target as claimed in claim 4, wherein the material of the outer film is of beryllium and of the inner film is of niobium.

6. A silicon diode array target as claimed in claim 4, wherein the thickness of the outer film is adjusted to absorb approximately one half of the incident electron energy.

7. A silicon diode array target as claimed in claim 4, wherein the density of the second layer is selected to be high enough to limit the lateral diffusion of the high energy electrons that penetrate into the inner film to less than one micron.

* * * * *